(12) United States Patent
Uyeno et al.

(10) Patent No.: US 9,791,554 B2
(45) Date of Patent: Oct. 17, 2017

(54) MULTIPLE-BEAM TRIANGULATION-BASED RANGE FINDER AND METHOD

(71) Applicant: Raytheon Company, Waltham, MA (US)

(72) Inventors: Gerald P. Uyeno, Tucson, AZ (US); Sean D. Keller, Tucson, AZ (US); Michael J. Batinica, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 125 days.

(21) Appl. No.: 14/660,285

(22) Filed: Mar. 17, 2015

(65) Prior Publication Data

US 2016/0274219 A1    Sep. 22, 2016

(51) Int. Cl.
*G01C 3/08* (2006.01)
*G01S 7/481* (2006.01)
(Continued)

(52) U.S. Cl.
CPC ......... *G01S 7/4814* (2013.01); *G01S 7/4813* (2013.01); *G01S 7/4815* (2013.01); *G01S 17/32* (2013.01); *G01S 17/48* (2013.01)

(58) Field of Classification Search
None
See application file for complete search history.

(56) References Cited

U.S. PATENT DOCUMENTS 6,262,800 B1   7/2001   Minor
8,033,221 B2  10/2011   Edwards
(Continued)

FOREIGN PATENT DOCUMENTS

DE        19852412 A1    5/2000
DE     102004003386 A1    9/2004
(Continued)

OTHER PUBLICATIONS

"International Application Serial No. PCT/US2016/013585, International Search Report mailed Apr. 25, 2016", 4 pgs.
(Continued)

*Primary Examiner* — Samantha K Abraham
(74) *Attorney, Agent, or Firm* — Schwegman Lundberg & Woessner, P.A.

(57) ABSTRACT

A multiple-beam triangulation-based range finder can direct multiple beams onto a sample from different orientations. The range finder can use a quadrant detector to detect light from the multiple beams that is reflected from the sample. The range finder generates a trigger signal when the target is a specified distance from the range finder. In some examples, two or more of the multiple beams are directed onto the sample simultaneously, where the beams are modulated at different frequencies and the signals from the quadrant detector are analyzed at the respective frequencies. In some examples, two or more of the multiple beams are directed onto the sample in succession, where the signals from the quadrant detector are analyzed in respective time windows. Using multiple beams with the quadrant detector can increase robustness against relative tilt of the sample with respect to the range finder.

20 Claims, 10 Drawing Sheets

(51) Int. Cl.
*G01S 17/48* (2006.01)
*G01S 17/32* (2006.01)

(56) References Cited

U.S. PATENT DOCUMENTS

| | | |
|---|---|---|
| 8,380,025 B2 | 2/2013 | Anderson et al. |
| 9,223,008 B1 * | 12/2015 | Hartman ................. G01S 5/163 |
| 2010/0305418 A1 | 12/2010 | Deliwala |
| 2012/0256764 A1 | 10/2012 | Zeng |

FOREIGN PATENT DOCUMENTS

| | | |
|---|---|---|
| EP | 2026104 A2 | 2/2009 |
| WO | WO-2016148768 A1 | 9/2016 |

OTHER PUBLICATIONS

"International Application Serial No. PCT/US2016/013585, Written Opinion mailed Apr. 25, 2016", 7 pgs.

"Microtrak tm 3", [online]. [retrieved on Jan. 6, 2015]. Retrieved from the Internet: <URL: http://www.mtiinstruments.com/products/microtrak3.aspx>, 1 pg.

"Microtrak tm 3 Producti Information", MTI Instruments, Inc. [online]. Retrieved from the Internet: <URL: http://www.mtiinstruments.com/pdf/products/microtrak3.pdf>, (published before Feb. 19, 2015), 4 pgs.

\* cited by examiner

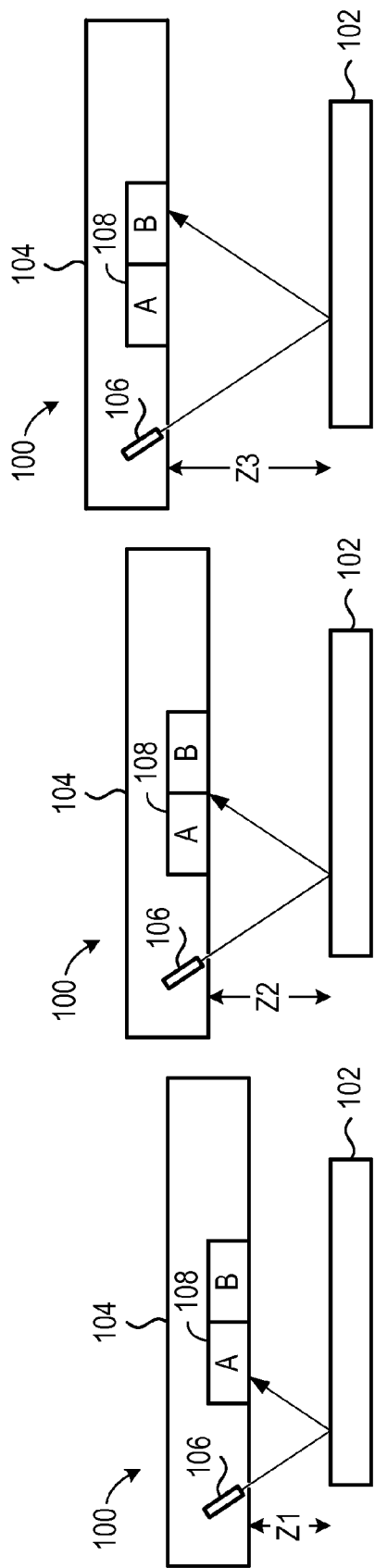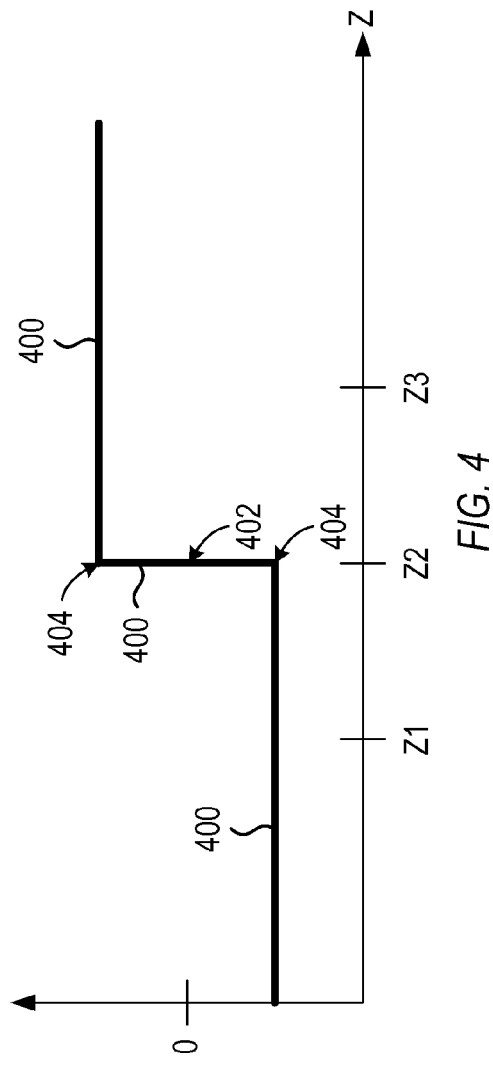

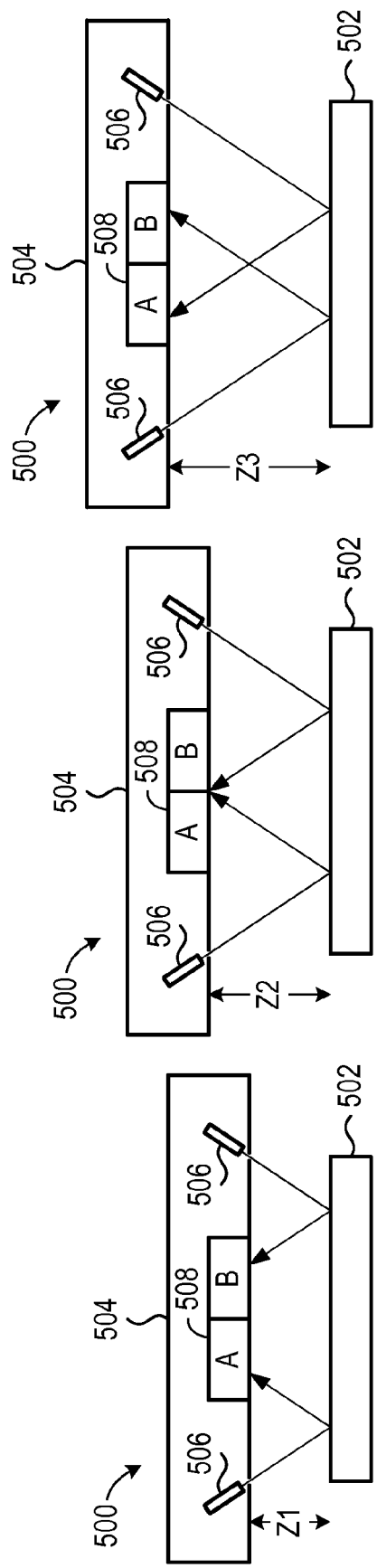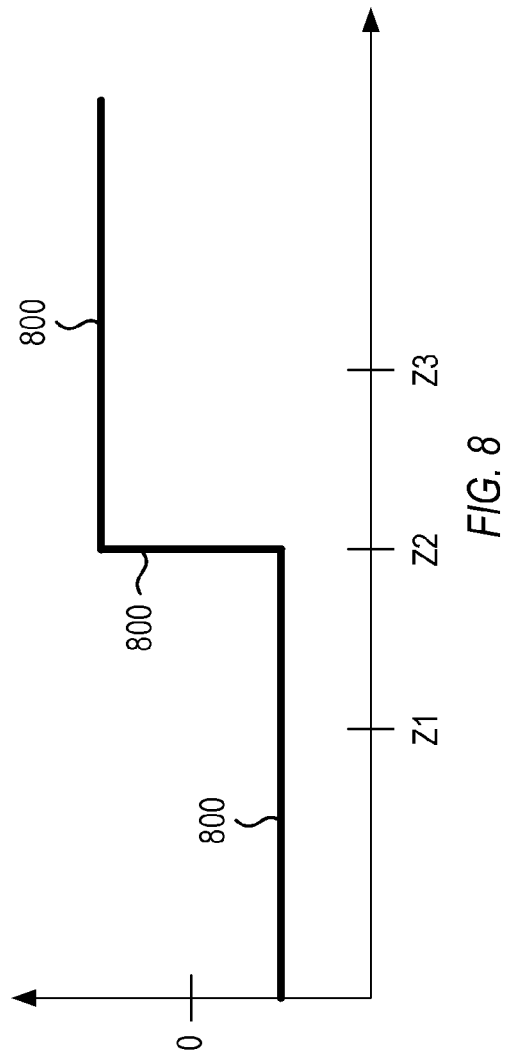

MULTIPLE-BEAM TRIANGULATION-BASED RANGE FINDER AND METHOD

TECHNICAL FIELD

The present disclosure relates to a multiple-beam, triangulation-based range finder.

BACKGROUND

In some examples, it can be desirable to trigger an action when a time-varying distance reaches a particular threshold. For instance, when an automobile backs up to an object, the automobile can apply the brakes when the automobile reaches a threshold distance from the object. As another example, in an automatic car wash, a cleaning element can approach a surface of the car, but can stop short of touching the surface. For these and other examples, it can be desirable to use a range finder to determine if or when the time-varying distance reaches the threshold.

Some commercially available range finders launch light toward a target, measure the light reflected from the target, and use a time-of-flight of the light to determine the distance to the target. These time-of-flight range finders are inadequate for relatively short distances, such as (but not limited to) 10 meters or less, and can be relatively complex and/or expensive.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

FIGS. 1-3 show an example of a single-beam triangulation-based range finder, disposed at three different distances away from a target, in accordance with some embodiments.

FIG. 4 is a plot of a difference signal obtained from the range finder as a function of spacing between the range finder and the target, in accordance with some embodiments.

FIGS. 5-7 show an example of a two-beam triangulation-based range finder, disposed at three different distances away from a target, in accordance with some embodiments.

FIG. 8 is a plot of a difference signal obtained from the range finder as a function of spacing between the range finder and the target, in accordance with some embodiments.

DETAILED DESCRIPTION

A multiple-beam triangulation-based range finder can direct multiple beams onto a sample from different orientations. In some examples, the range finder can use a quadrant detector to detect light from the multiple beams that is reflected from the sample. The range finder generates a trigger signal when the target is a specified distance from the range finder. In some examples, two or more of the multiple beams are directed onto the sample simultaneously, where the beams are modulated at different frequencies and the signals from the quadrant detector are analyzed at the respective frequencies. In some examples, two or more of the multiple beams are directed onto the sample in succession, where the signals from the quadrant detector are analyzed in respective time windows. Using multiple beams with the quadrant detector can increase robustness against relative tilt of the sample with respect to the range finder. This can be advantageous for specularly reflecting surfaces, for slightly rough surfaces exhibiting a small amount of scattering upon reflectance, for reflecting surfaces exhibiting Lambertian reflectance, and for non-flat surfaces that may exhibit significant reflectance away from the incident angle.

Figure 9:
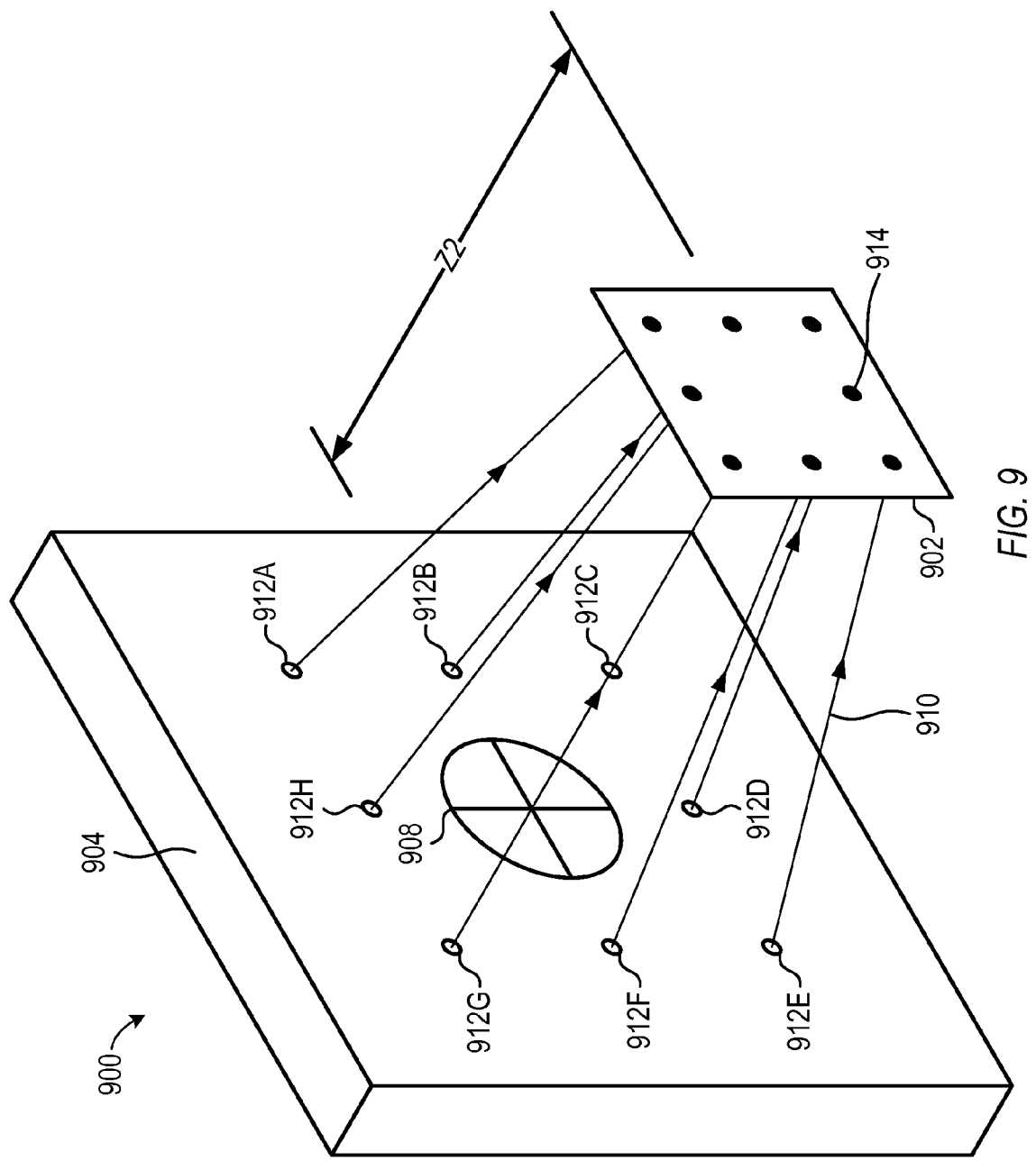
FIGS. 9-10 show an example of a multi-beam triangulation-based range finder, disposed away from a target, in accordance with some embodiments.
Figure 10:
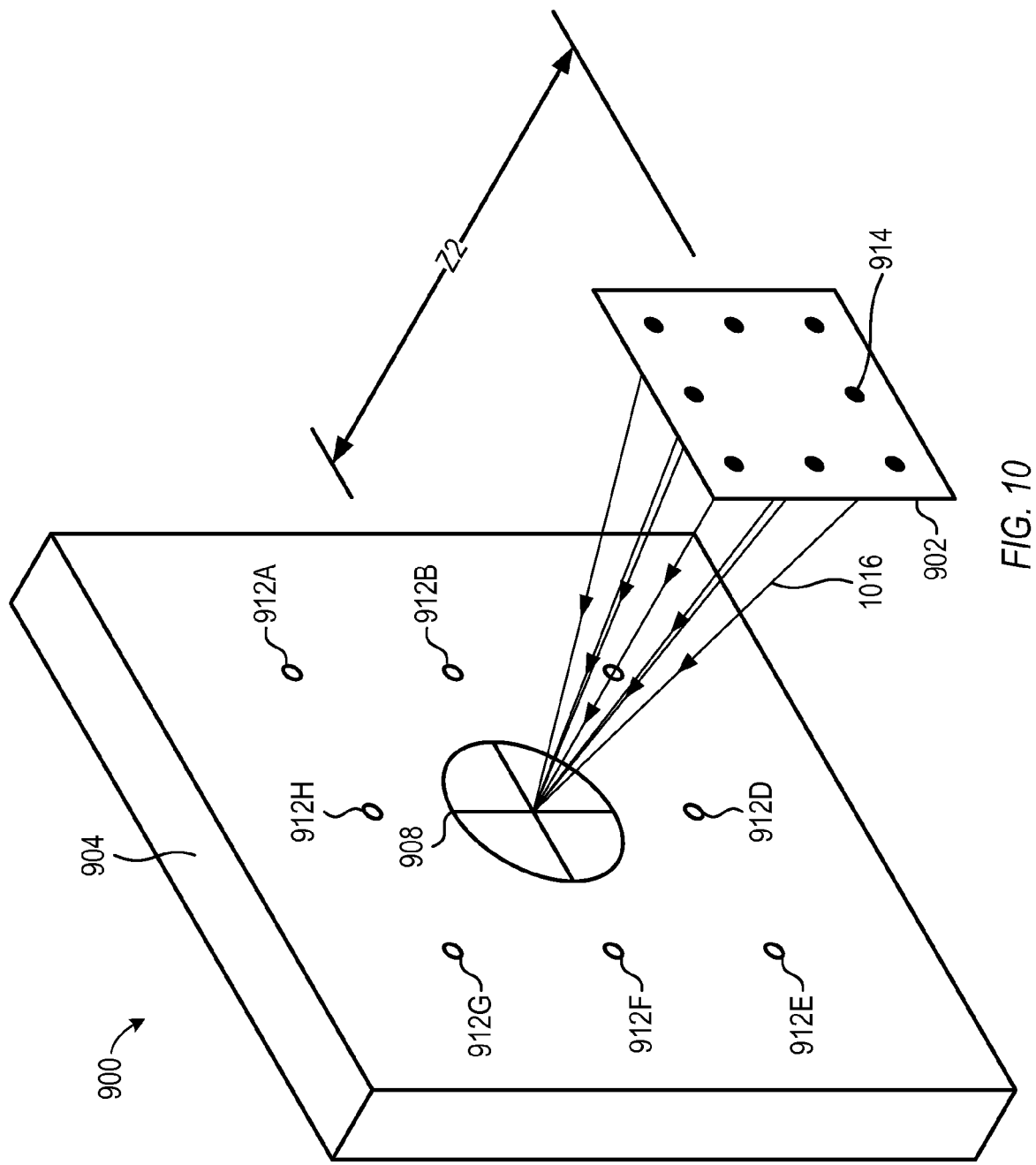
Figure 11:
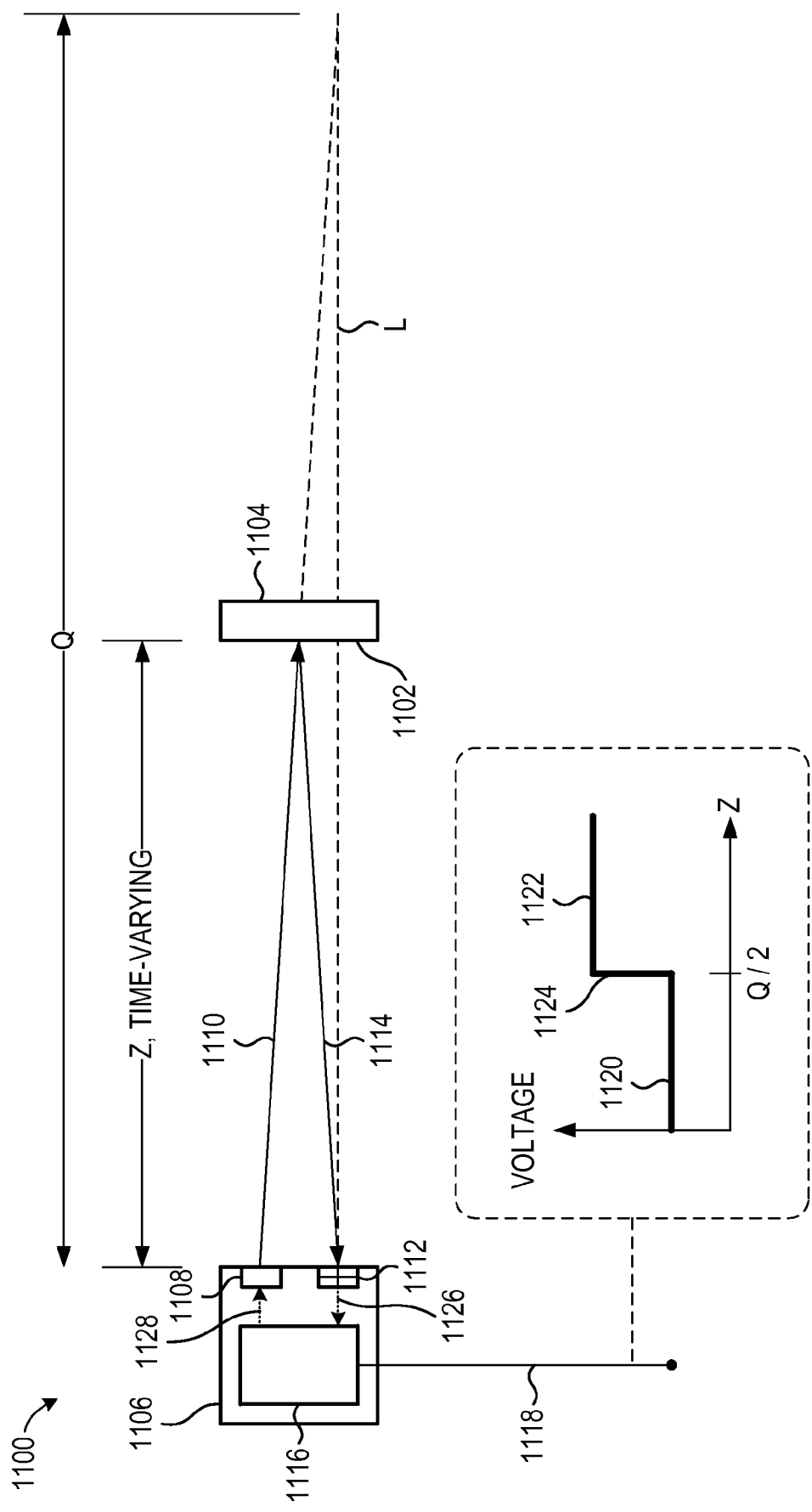
FIG. 11 shows an example of a multiple-beam triangulation-based range finder, which can include any or all of the features shown in FIGS. 1-10, in addition to electronics that can control the light source and can receive signals from the multi-element detector, in accordance with some embodiments.

The following discussion describes systems of increasing complexity, so that various aspects can be emphasized more clearly. FIGS. 1-3 show an example of a range finder that uses triangulation with a single beam, in accordance with some embodiments. The accompanying text explains how using triangulation on a split detector can provide a difference signal that crosses zero when a target is a specified distance away from the range finder. FIGS. 5-7 show an example of a range finder that uses triangulation with two beams. The accompanying text explains how using two beams on the same split detector can increase robustness in the presence of target tilt. FIGS. 9-10 show an example of a range finder that uses triangulation with multiple beams. The accompanying text explains how using multiple beams on the same quadrant detector can increase robustness in the presence of target tilt along two dimensions. FIG. 11 shows an example of a full range finder system, which can include all the features shown in FIGS. 1-10, in addition to electronics that can control a light source and can receive signals from the multi-element detector.

FIGS. 1-3 show an example of a single-beam triangulation-based range finder 100, disposed at three different distances away from a target 102, in accordance with some embodiments. Distances between the range finder 100 and the target 102 in FIGS. 1-3 are denoted as Z1, Z2, and Z3, respectively.

Range finder 100 includes a housing 104, a light source 106 that directs a beam out of the housing 104 toward the target 102, and a split detector 108 that detects light reflected from the target 102. Split detector 108 includes two adjoining detector elements denoted by A and B. Circuitry (not shown) can control the light source and can receive the electrical signals produced by A and B. The circuitry can form a difference signal from the two elements of the split detector, which can be denoted by B−A. The difference signal can be expressed in units of voltage, current or other suitable unit, or can be normalized (such as by a sum signal B+A) to be dimensionless. In some examples, the absolute sign of the difference signal can be reversed.

In FIG. 1, distance Z1 is less than a specified threshold distance, so that light returning from the target 102 strikes detector element A. In FIG. 2, distance Z2 equals the specified threshold distance, so that light returning from the target 102 is split evenly between detector elements A and B. In FIG. 3, distance Z3 is greater than the specified threshold distance, so that light returning from the target 102 strikes detector element B.

FIG. 4 is a plot of a difference signal 400 obtained from the range finder 100 as a function of spacing between the range finder 100 and the target 102, in accordance with some embodiments. The difference signal is formed as B-A, with the signal from detector element A being subtracted from the signal from detector element B. For spacings less than Z2, such as Z1, the difference signal 400 has a negative value. For spacings greater than Z2, such as Z3, the difference signal 400 has a positive value. For spacings at or near Z2, the difference signal 400 crosses zero to go from negative to positive. The zero-crossing 402 in FIG. 4 is shown as being infinitely steep with sharp corners; in practice, the shape of the zero-crossing 402 depends on the size of the beam striking the split detector. As the beam size increases, the zero crossing 402 becomes less steep, and the corners 404 become more rounded in the difference signal 400. For some applications in which the spacing changes rapidly with time, it can be advantageous to use a less steep zero crossing and more rounding in the corners.

FIGS. 5-7 show an example of a two-beam triangulation-based range finder 500, disposed at the distances Z1, Z2, and Z3 away from a target 502, in accordance with some embodiments. Compared with the single-beam range finder 100 of FIGS. 1-3, the two-beam range finder 500 can have increased robustness against relative tilt of the target 502 with respect to the range finder 500.

Range finder 500 includes a housing 504, a light source 506 that direct two beams out of the housing 504 toward the target 502, and a split detector 508 with detector elements A and B that detect light reflected from the target 502. Circuitry (not shown) can control the light source and can receive the electrical signals produced by A and B.

The circuitry can match a signal from the split detector 508 to a particular beam from the light source. In some configurations, where the light source 506 directs the two beams onto the sample simultaneously, the circuitry can modulate the beams at different frequencies, and can analyze the signals from the quadrant detector at the respective frequencies. For instance, one beam can be modulated at 200 Hz, the other beam can be modulated at 250 Hz. The circuitry can process the signals from detector elements A and B to extract the corresponding signal contributions at 200 Hz and 250 Hz, such as with a Fast Fourier Transform module or a lock-in amplifier coupled to the modulating frequencies. In other configurations, where the light source 506 directs the two beams onto the sample in succession, the signals from detector elements A and B can be analyzed in respective time windows.

FIG. 8 is a plot of a difference signal 800 obtained from the range finder 500 as a function of spacing between the range finder 500 and the target 102, in accordance with some embodiments. In this example, the difference signal 800 is formed by using B−A for the leftmost beam in FIGS. 5-7, and additionally by using A−B for the rightmost beam in FIGS. 5-7. In some examples, the difference signals are summed or averaged. In the example of FIG. 8, for which the target is not tilted with respect to the range finder, both difference signals are identical, and both are superimposed on the plot of difference signal 800. For examples in which the target is tilted with respect to the range finder, the difference signals obtained from the leftmost and rightmost beams can differ, such as by crossing zero at different Z locations. Combining two distinct difference signals, such as by summing or averaging, can help improve the robustness against relative tilt of the target 502 with respect to the range finder 500.

FIGS. 9-10 show an example of a multi-beam triangulation-based range finder 900, disposed at distance Z2 away from a target 902, in accordance with some embodiments. Compared with the two-beam range finder 500 of FIGS. 5-7, the multi-beam range finder 900 can have increased robustness against relative tilt in two dimensions of the target 902 with respect to the range finder 900.

Range finder 900 includes a housing 904, a light source (not shown) that directs various beams 910 from respective locations 912A-H on the housing 904 toward the target 902, and a quadrant detector 908 that can detect light reflected from the target 902. In the example of FIG. 9, light beams emerging from locations 912A, 912C, 912E, and 912G have equal inclination angles with respect to the longitudinal axis. In the example of FIG. 9, light beams emerging from locations 912B, 912D, 912F, and 912H have equal inclination angles with respect to the longitudinal axis. Circuitry (not shown) can control the light source and can receive the electrical signals produced by elements of the quadrant detector 908.

Whereas FIG. 9 shows beams 910 emerging from the housing 904 and striking the target 902 at respective locations 914, FIG. 10 shows portions of the beams 910 reflected toward the quadrant detector as beams 1016. In FIGS. 9 and 10, the target 902 is shown as being distance Z2 from the housing 904, so that beams 1016 all converge to the center of the quadrant detector 908.

Circuitry (not shown) can match a signal from the quadrant detector 908 to a particular beam from the light source. In some examples, the circuitry can simultaneously modulate two or more beams at different modulation frequencies, and can analyze the quadrant detector signals at the respective modulation frequencies. In some examples, the circuitry can direct two or more beams onto the target 902 sequentially (e.g., in a time-multiplexed manner), and can analyze the quadrant detector signals in the corresponding time windows.

Directing multiple beams from various locations 912A-H on the housing 904 toward the target 902, and collecting light reflected from the target 902 with the quadrant detector 908 can increase robustness of the difference signals in the presence of target tilt in two dimensions.

In some configurations, the range finder can emit beams that intersect the longitudinal axis at different distances away from the housing. For these configurations, the range finder can generate multiple trigger signals, corresponding to cases when the target is positioned at the respective distances away from the housing. In some examples, the range finder can use a first trigger signal, corresponding to a first distance away from the housing, to take a specified action within the range finder or external to the range finder. For instance, the first trigger signal can activate a circuit or a subsystem, or can change the gain of a particular signal. In some examples, the range finder can use the detection of a first trigger signal to change the gain of a second trigger signal, where the second trigger signal is detected at a smaller separation between the housing and the target than the first trigger signal.

In some examples, the housing can emit at least two of these beams from the same location on the housing. In some examples, the housing can use one or more beam-steering elements to direct light from a single light-producing element to form the exiting beams. Examples of suitable beam-steering elements can include one or more moving mirrors, one or more translatable and/or rotating mirrors and/or lenses, one or more waveguides that redirects an output beam in response to an applied voltage, and other suitable beam-steering elements. In some examples, the housing can emit at least two of these beams from different locations on the housing.

In some examples, a beam-steering element can controllably vary an inclination angle of any light beam emergent from the housing, and can thereby vary the location at which the light beam intersects the longitudinal axis. For instance, the beam-steering element can includes a waveguide that redirects a light beam in response to an applied voltage. Controllably varying the location at which a light beam intersects the longitudinal axis can allow the range finder to have a sensitivity at a controllable and variable distance away from the housing.

FIG. 11 shows an example of a multiple-beam triangulation-based range finder 1100, which can include any or all of the features shown in FIGS. 1-10, in addition to electronics that can control the light source and can receive signals from the multi-element detector, in accordance with some embodiments.

Range finder 1100 can produce a trigger signal when a reflective surface 1102 of a target 1104 is spaced from the range finder 1100 by a specified distance. In some examples, the reflective surface 1102 can be a surface of an object, which faces the range finder 1100. In some examples, the reflective surface 1102 can be the ground. The reflective surface need not be flat or smooth. Target 1104 is not part of the range finder 1100. Range finder 1100 is but one example of a range finder; other suitable range finders can also be used.

A housing 1106 defines a longitudinal axis L, which extends away from housing 1106 and toward target 1104.

A light source 1108 is coupled to the housing 1106. Light source 1108 can emit two or more beams, such as 1110, from respective locations on the housing 1106. For clarity, FIG. 11 shows only one beam 1110. In some examples, light source 1108 emits the beams 1110 with respective orientations so that the beams 1110 intersect the longitudinal axis L at a distance Q away from the housing 1106. Beams 1110 intersecting the longitudinal axis L at a distance Q away from the housing 1106 can contribute to generating a trigger signal when the target 1104 is positioned at a distance Q/2 away from the housing 1106. Directing multiple beams toward the same intersection point at distance Q along the longitudinal axis L can help increase the robustness of the range finder 1100 when the target 1104 has a reflecting surface 1102 that is angled away from perpendicular to the longitudinal axis L, where the angling can be in two dimensions (e.g., the angling can include a component angled within the plane of the page in FIG. 11, and can include a component angled out of the plane of the page in FIG. 11). In some examples, light source 1108 can emit beams 1110 that intersect the longitudinal axis L at different distances away from the housing 1106. For these examples, the range finder 1110 can produce trigger signals when the target 1104 is positioned at each of several specified distances away from the housing 1106.

A quadrant detector 1112 is coupled to the housing 1106. Quadrant detector 1112 can be centered with respect to the longitudinal axis L. For instance, quadrant detector 1112 can include four detector elements arranged in a rectilinear pattern, and longitudinal axis L can intersect the quadrant detector 1112 at a center of the rectilinear pattern. Quadrant detector 1112 can receive light 1114 from the light beams 1110 which is reflected from the target 1104 when the target 1104 is positioned along the longitudinal axis L.

Circuitry 1116 is coupled to the quadrant detector 1112, and can produce a trigger signal when the target 1104 is spaced from the housing 1106 by distance Q/2. When the target 1104 is located at distance Q/2, the returning light 1114 can be centered on the quadrant detector 1112. When the target 1104 is spaced closer to or further from the housing 1106 than distance Q/2, the returning light 1114 is positioned on one side or the other of the centered position. By subtracting signals produced by the quadrant elements on opposite sides of the centered position, circuitry 1116 can produce a signal that crosses zero when the target 1104 is located at distance Q/2 away from the housing 1106.

In some examples, circuitry 1116 outputs a voltage 1118 that varies with distance Z between the target 1104 and the housing 1106. When Z is less than Q/2, the output voltage 1118 can be a first value 1120. When Z is greater than Q/2, the output voltage 1118 can be a second value 1122, different from the first value 1120. In the region 1124 of Z values close to Q/2, the output voltage can transition from the first value 1120 to the second value 1122. The sharpness and steepness of the transition can decrease as the size of the returning light beam increases.

The output voltage 1118 can be used directly as a trigger signal, which can be used by another device to trigger an event when the voltage changes. Alternatively, the output voltage 1118 can be processed to form a trigger signal. For instance, the trigger signal can be formed as a first derivative of the voltage, which can show a spike at the transition 1124 and can have a relatively small value at other Z locations. In some examples, the circuitry 1116 produces the trigger signal by subtracting at least two signals produced by elements of the quadrant detector 1112.

In addition to receiving one or more signals 1126, circuitry 1116 can also control the light source 1108, such as with control signal 1128. Control signal 1128 can switch a light-producing element on and off, can control a power level of the light-producing element, can modulate the light producing-element at a specified frequency, and/or can direct a separate light modulator to modulate light from the light-producing element at a specified frequency.

Figure 12:
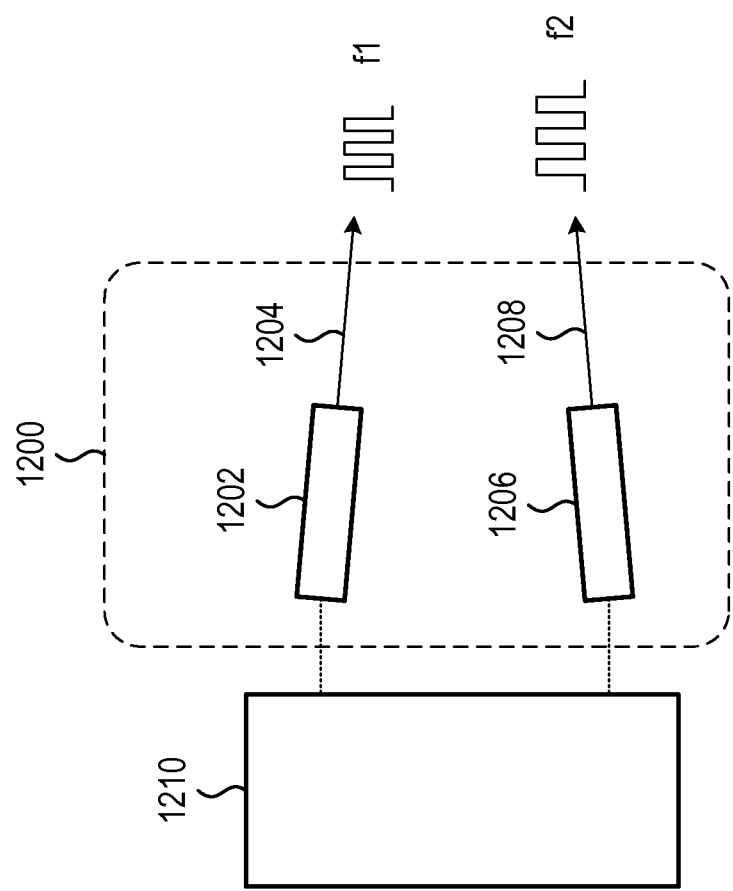
FIG. 12 shows an example of a light source, which can emit first and second beams simultaneously, in accordance with some embodiments.

FIG. 12 shows an example of a light source 1200, which can emit first and second beams simultaneously, in accordance with some embodiments. It will be understood that the configuration of light source 1200 can be extended to include any suitable number of beams.

Light source 1200 includes a first light-producing element 1202 to generate the first light beam 1204. Light source 1200 further includes a second light-producing element 1206, spaced apart from the first light-producing element 1202, to generate the second light beam 1208. Either or both light-producing elements 1202, 1206 can be a light-emitting diode, a diode laser, a pulsed laser, or another suitable light-producing element. In some examples, the light-producing elements 1202, 1206 can include collimating optics that produce a collimated or a nearly collimated output, so that the beams emitted from the range finder are collimated or nearly collimated.

In some examples, the first light-producing element 1202 modulates the first light beam 1204 at a first frequency f1. In some examples, the second light-producing element 1206 modulates the second light beam 1208 at a second frequency f2, different from the first frequency f1. Modulating the light beams at different frequencies can allow a single detector (or set of detector elements) to capture the reflected light from the light beams, and can allow the circuitry 1210 to separate the signals in the electrical domain based on the different frequencies. In some examples, the circuitry 1210 associates signals from the quadrant detector at the first frequency f1 with the first light beam 1204. In some examples, the circuitry 1210 associates signals from the quadrant detector at the second frequency f2 with the second light beam 1208.

In some examples, the circuitry directly modulates one or both of the light-producing elements 1202, 1206, such as by turning it on and off at the respective modulation frequency. In some examples, the light source can include a modulator, such as an electro-optic modulator, an acousto-optic modulator, or a chopper wheel, which can modulate beams emitted by one or both of the light-producing elements 1202, 1206.

Figure 13:
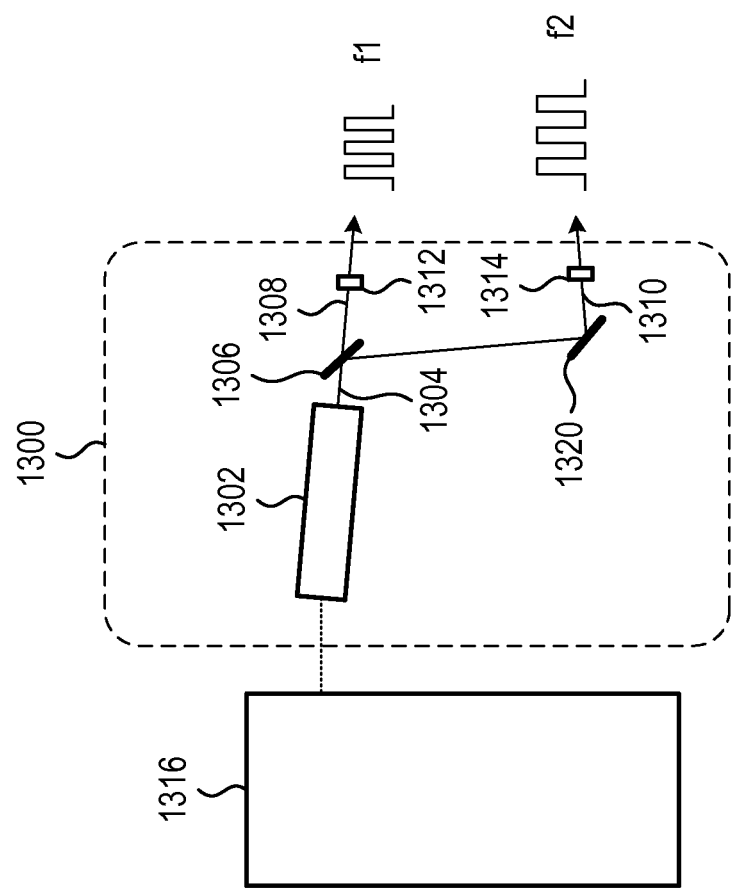
FIG. 13 shows another example of a light source, which can emit first and second beams simultaneously, in accordance with some embodiments.

FIG. 13 shows another example of a light source 1300, which can emit first and second beams simultaneously, in accordance with some embodiments. It will be understood that the configuration of light source 1300 can be extended to include any suitable number of beams.

A light-producing element 1302 can produce an incident beam 1304. The light-producing element 1302 can be a light-emitting diode, a diode laser, a pulsed laser, or another suitable light-producing element. A beamsplitter 1306 can direct a first fraction of the incident beam 1304 into the first light beam 1308 and a second fraction of the incident beam 1304 into the second light beam 1310. The optical path of the first and/or second beams can optionally include one or more mirrors 1320. A first modulator 1312 can modulate the first light beam 1308 at a first frequency. A second modulator 1314 can modulate the second light beam 1310 at a second frequency, different from the first frequency. The circuitry 1316 can associate signals from the quadrant detector at the first frequency with the first light beam 1308. The circuitry 1316 can associate signals from the quadrant detector at the second frequency with the second light beam 1310.

Figure 14:
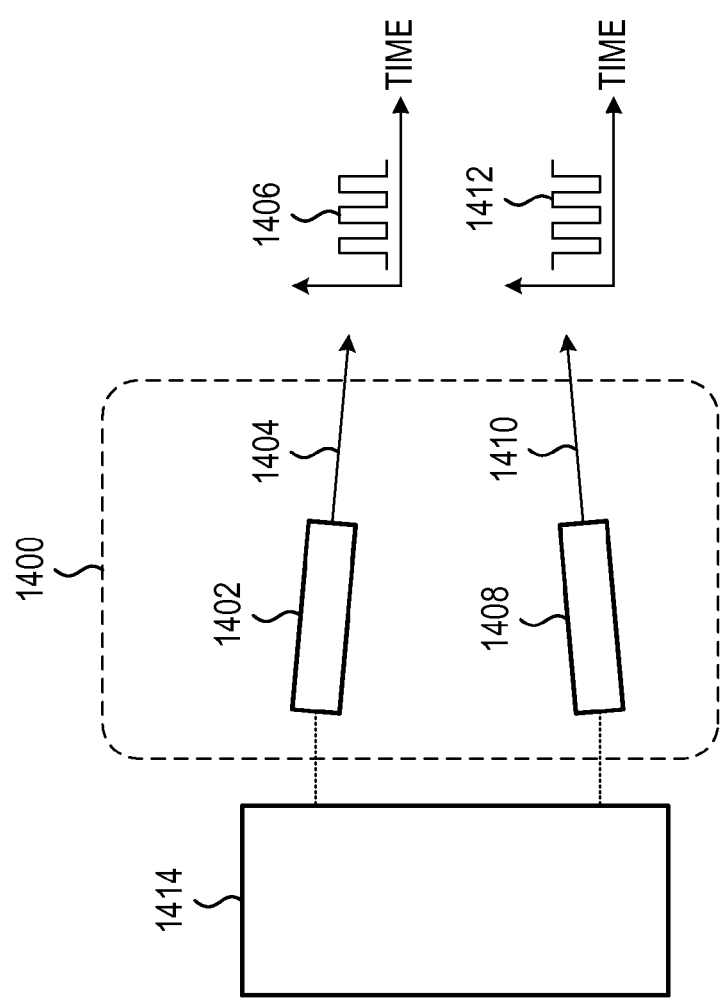
FIG. 14 shows an example of a light source, which can emit the first and second light beams sequentially, in accordance with some embodiments.

FIG. 14 shows an example of a light source 1400, which can emit the first and second light beams sequentially, in accordance with some embodiments. It will be understood that the configuration of light source 1400 can be extended to include any suitable number of beams.

A first light-producing element 1402 can generate the first light beam 1404 in a first time interval 1406. A second light-producing element 1408, spaced apart from the first light-producing element 1402, can generate the second light beam 1410 in a second time interval 1412, different from the first time interval 1406. The circuitry 1414 can associate signals from the quadrant detector within the first time interval 1406 with the first light beam 1404. The circuitry 1414 can associate signals from the quadrant detector within the second time interval 1412 with the second light beam 1410. In the example of FIG. 14, the duty cycle of each beam is 50%, which would result in essentially a continuous-wave signal at the detector. In other examples, the duty cycle of one or both beams can be selected to be less than 50%, so that the beams rise and fall in intensity at the detector. In some examples, this rise and fall in intensity can be beneficial, and can help keep the circuitry synchronized to the appropriate beam.

Figure 15:
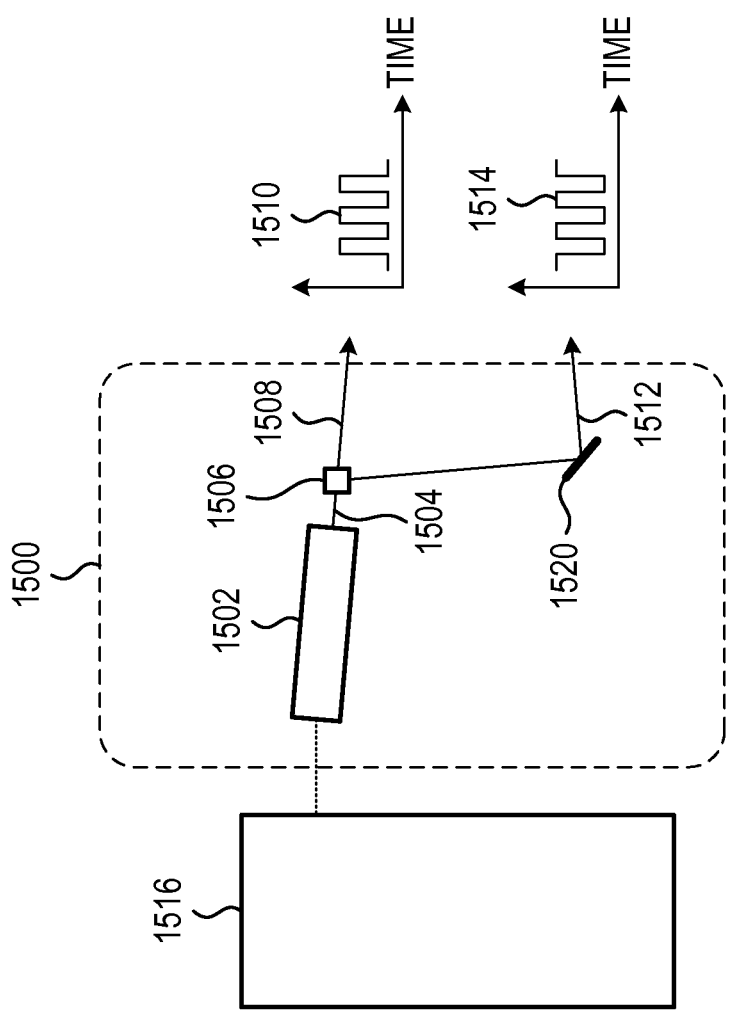
FIG. 15 shows another example of a light source, which can emit the first and second light beams sequentially, in accordance with some embodiments.

FIG. 15 shows another example of a light source 1500, which can emit the first and second light beams sequentially, in accordance with some embodiments. It will be understood that the configuration of light source 1500 can be extended to include any suitable number of beams.

A light-producing element 1502 can produce an incident beam 1504. A beam steering element 1506 can direct the incident beam 1504 into the first light beam 1508 during a first time interval 1510 and direct the incident beam 1504 into the second light beam 1512 during a second time interval 1514, different from the first time interval 1510. The circuitry 1516 can associate signals from the quadrant detector within the first time interval 1510 with the first light beam 1508. The circuitry 1516 can associate signals from the quadrant detector within the second time interval 1514 with the second light beam 1512.

Any or all of the light source configurations in FIGS. 12-15 can be used with any or all of the range finder configurations of FIGS. 1-3, 5-7, 9-10, and 11.

Figure 16:
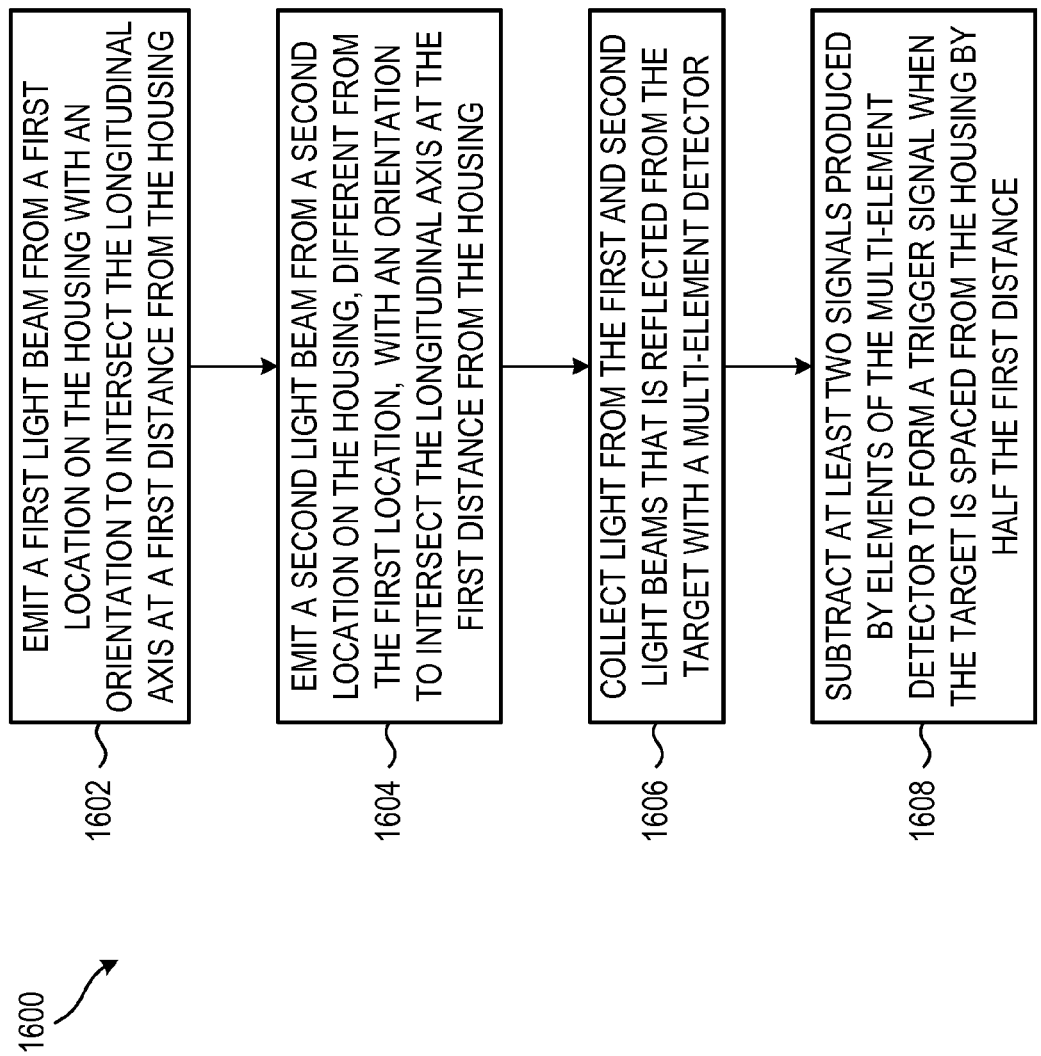
FIG. 16 is a flow chart of an example of a method for determining a time-varying distance between a housing, the housing defining a longitudinal axis, and a target disposed along the longitudinal axis, in accordance with some embodiments.

FIG. 16 is a flow chart of an example of a method 1600 for determining a time-varying distance between a housing, the housing defining a longitudinal axis, and a target disposed along the longitudinal axis, in accordance with some embodiments. The method 1600 can be executed on any suitable range finder, such as the range finders shown in FIGS. 1-3, 5-7, 9-10, and 11.

At operation 1602, a first light beam is emitted from a first location on the housing with an orientation to intersect the longitudinal axis at a first distance from the housing.

At operation 1604, a second light beam is emitted from a second location on the housing, different from the first location, with an orientation to intersect the longitudinal axis at the first distance from the housing.

At operation 1606, light from the first and second light beams that is reflected from the target is collected with a multi-element detector. Examples of suitable multi-element detectors include split detector, quadrant detectors, an array of detector elements arranged in a rectilinear pattern, a circular array of wedge-shaped detector elements, and others.

At operation 1608, at least two signals produced by elements of the multi-element detector are subtracted to form a trigger signal when the target is spaced from the housing by half the first distance.

In some examples, the first and second light beams are emitted simultaneously. In some examples, method 1600 can further include modulating the first and second light beams at respective different first and second frequencies. In some examples, method 1600 can further include associating signals from the quadrant detector at the first frequency with the first light beam. In some examples, method 1600 can further include associating signals from the quadrant detector at the second frequency with the second light beam. In some examples, method 1600 can further include forming the trigger signal using signals from both the first and second light beams.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, range finder systems may include one or more processors and may be configured with instructions stored on a computer-readable storage device.

What is claimed is:

1. A multiple-beam triangulation-based range finder, comprising:
   a housing defining an axis extending from the housing toward a target to be measured;
   a light source coupled to the housing, the light source configured to emit a first light beam from a first location on the housing with an orientation to intersect the axis at a first distance from the housing, the light source further configured to emit a second light beam from a second location on the housing, different from the first location, with an orientation to intersect the axis at the first distance from the housing;
   a quadrant detector coupled to the housing, centered with respect to the axis, and configured to receive light from the first and second light beams that is reflected from the target when the target is positioned along the axis; and
   circuitry coupled to the quadrant detector and configured to produce a trigger signal that has a first value when the target is spaced from the housing by less than half the first distance and has a second value, different from the first value, when the target is spaced from the housing by more than half the first distance, wherein the trigger signal switches from the second value to the first value, triggering an action.

2. The range finder of claim 1, wherein the circuitry produces the trigger signal by subtracting a first of at least two signals produced by elements of the quadrant detector from a second of the at least two signals produced by the elements of the quadrant detector.

3. The range finder of claim 1, wherein the light source emits the first and second light beams simultaneously.

4. The range finder of claim 3, wherein the light source comprises:
   a first light-producing element to generate the first light beam; and
   a second light-producing element, spaced apart from the first light-producing element, to generate the second light beam.

5. The range finder of claim 4, wherein the first light-producing element modulates the first light beam at a first frequency;
   wherein the circuitry associates signals from the quadrant detector at the first frequency with the first light beam;
   wherein the second light-producing element modulates the second light beam at a second frequency, different from the first frequency; and
   wherein the circuitry associates signals from the quadrant detector at the second frequency with the second light beam.

6. The range finder of claim 3, wherein the light source comprises:
   a light-producing element configured to produce an incident beam; and
   a beamsplitter configured to direct a first fraction of the incident beam into the first light beam and a second fraction of the incident beam into the second light beam.

7. The range finder of claim 6, further comprising:
   a first modulator configured to modulate the first light beam at a first frequency; and
   a second modulator configured to modulate the second light beam at a second frequency, different from the first frequency;
   wherein the circuitry associates signals from the quadrant detector at the first frequency with the first light beam; and
   wherein the circuitry associates signals from the quadrant detector at the second frequency with the second light beam.

8. The range finder of claim 1, wherein the light source emits the first and second light beams sequentially.

9. The range finder of claim 8, wherein the light source comprises:
   a first light-producing element to generate the first light beam in a first time interval, wherein the circuitry associates signals from the quadrant detector within the first time interval with the first light beam; and
   a second light-producing element, spaced apart from the first light-producing element, to generate the second light beam in a second time interval, different from the first time interval, wherein the circuitry associates signals from the quadrant detector within the second time interval with the second light beam.

10. The range finder of claim 8, wherein the light source comprises:
    a light-producing element configured to produce an incident beam; and
    a beam steering element configured to direct the incident beam into the first light beam during a first time interval and direct the incident beam into the second light beam during a second time interval, different from the first time interval.

11. The range finder of claim 10, wherein the circuitry associates signals from the quadrant detector within the first time interval with the first light beam; and
    wherein the circuitry associates signals from the quadrant detector within the second time interval with the second light beam.

12. The range finder of claim 1,
    wherein the light source emits the first and second light beams at respective first and second inclination angles with respect to the longitudinal axis; and
    wherein the first and second inclination angles are equal.

13. The range finder of claim 1,
    wherein the light source emits the first and second light beams at respective first and second inclination angles with respect to the longitudinal axis; and
    wherein the first and second inclination angles are different.

14. The range finder of claim 1, wherein the light source is further configured to emit a third light beam from a third location on the housing with an orientation to intersect the axis at a second distance from the housing.

15. The range finder of claim 1, wherein the light source includes a beam-steering element configured to controllably vary an inclination angle of the first light beam, and thereby vary the location at which the first light beam intersects the longitudinal axis.

16. The range finder of claim 15, wherein the beam-steering element includes a waveguide that redirects the first light beam in response to an applied voltage.

17. A method for determining a time-varying distance between a housing, the housing defining an axis extending from the housing toward a target disposed along the axis, comprising:

emitting a first light beam from a first location on the housing with an orientation to intersect the axis at a first distance from the housing;

emitting a second light beam from a second location on the housing, different from the first location, with an orientation to intersect the axis at the first distance from the housing;

collecting light from the first and second light beams that is reflected from the target with a multi-element detector;

subtracting a first of at least two signals produced by elements of the multi-element detector from a second of the at least two signals produced by the elements of the multi-element detector to form a trigger signal that has a first value when the target is spaced from the housing by less than half the first distance and has a second value, different from the first value, when the target is spaced from the housing by more than half the first distance, and wherein the trigger signal switches from the second value to the first value, triggering an action.

18. The method of claim 17, wherein the first and second light beams are emitted simultaneously; and further comprising:

modulating the first and second light beams at respective different first and second frequencies;

associating signals from the multi-element detector at the first frequency with the first light beam;

associating signals from the multi-element detector at the second frequency with the second light beam; and forming the trigger signal using signals from both the first and second light beams.

19. A multiple-beam triangulation-based range finder, comprising:

a housing defining an axis extending from the housing toward a target to be measured, a light source coupled to the housing, the light source configured to simultaneously emit first and second light beams from respective first and second locations on the housing, the first and second light beams having orientations to both intersect the axis at a first distance from the housing, the light source modulating the first and second light beams at respective first and second frequencies;

a quadrant detector coupled to the housing, centered with respect to the axis, and configured to receive light from the first and second light beams that is reflected from the target when the target is positioned along the axis; and circuitry coupled to the quadrant detector and configured to produce a trigger signal that has a first value when the target is spaced from the housing by less than half the first distance and has a second value, different from the first value, when the target is spaced from the housing by more than half the first distance, the circuitry associating signals from the quadrant detector at the first frequency with the first light beam, the circuitry associating signals from the quadrant detector at the second frequency with the second light beam, the circuitry forming the trigger signal using signals from both the first and second light beams, wherein the trigger signal switches from the second value to the first value, triggering an action.

20. The range finder of claim 19, wherein the circuitry produces the trigger signal by subtracting a first of at least two signals produced by elements of the quadrant detector from a second of the at least two signals produced by the elements of the quadrant detector.

* * * * *

UNITED STATES PATENT AND TRADEMARK OFFICE
CERTIFICATE OF CORRECTION

PATENT NO. : 9,791,554 B2
APPLICATION NO. : 14/660285
DATED : October 17, 2017
INVENTOR(S) : Uyeno et al.

It is certified that error appears in the above-identified patent and that said Letters Patent is hereby corrected as shown below:

In the Specification

In Column 6, Line 1, delete "1110" and insert --1100-- therefor

Signed and Sealed this
Fourth Day of June, 2019

Andrei Iancu
*Director of the United States Patent and Trademark Office*